W. B. KNAPP.
SHOCK ABSORBER.
APPLICATION FILED SEPT. 19, 1908.

935,525.

Patented Sept. 28, 1909.

Witnesses:
H. B. Davis
Cynthia Doyle

Inventor:
William B. Knapp
by Noyes & Hammond
Attys.

UNITED STATES PATENT OFFICE.

WILLIAM BRUCE KNAPP, OF STONEHAM, MASSACHUSETTS, ASSIGNOR TO KNAPP-GREENWOOD COMPANY, OF BOSTON, MASSACHUSETTS, A CORPORATION OF MAINE.

SHOCK-ABSORBER.

935,525.

Specification of Letters Patent.   Patented Sept. 28, 1909.

Application filed September 19, 1908.   Serial No. 453,752.

*To all whom it may concern:*

Be it known that I, WILLIAM BRUCE KNAPP, of Stoneham, county of Middlesex, State of Massachusetts, have invented an Improvement in Shock-Absorbers, of which the following is a specification.

This invention relates to shock absorbers for automobiles and the like, and has for its object to improve the construction of the same to the end that it will offer a slight resistance to feeble shocks and a great resistance to violent shocks; that the resistance which it offers to violent shocks is variable, being slight at the start and finish and great therebetween; that it is capable of adjustment in such manner that the resistance it offers to violent shocks may be regulated; that it will yieldingly limit the movement of the body in a direction away from the running gear; that it is capable of adjustment in such manner as to offer approximately the same slight resistance to feeble shocks regardless of the weight of the load.

Figure 1:
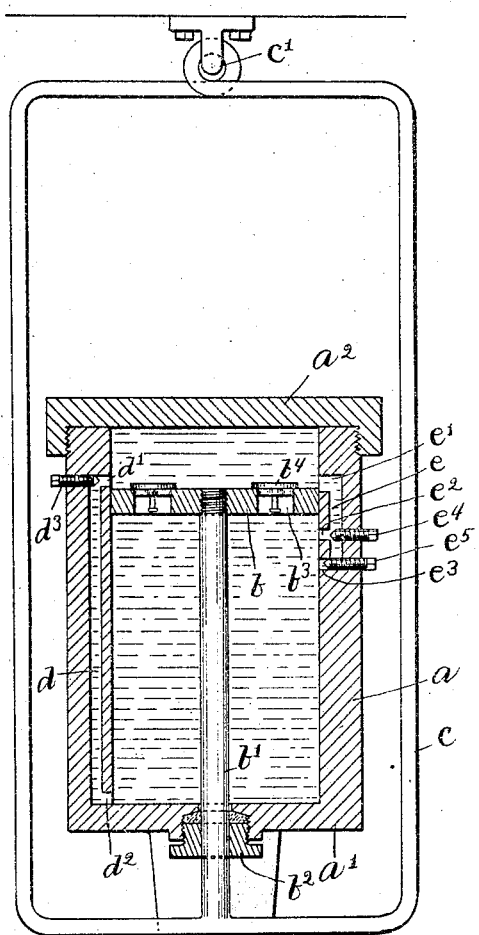
Figure 2:
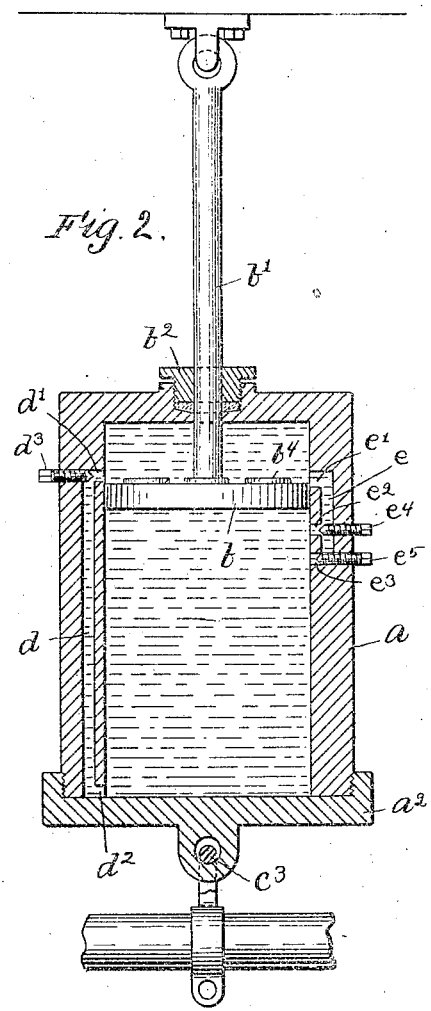
Figure 3:
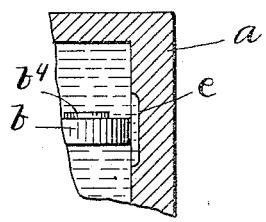

Fig. 1 is a vertical section of a shock absorber embodying this invention. Fig. 2 is a vertical section of a modified form of shock absorber, and Fig. 3 is a detail of a modification to be referred to.

$a$ represents a hollow cylinder having closed ends or heads $a^1$, $a^2$. It may be constructed in any suitable manner and of any suitable dimensions. It is adapted to be filled with glycerin or a compound containing glycerin, or any other suitable liquid material or fluid. $b$ represents a piston which is contained in said cylinder and connected to a piston rod $b'$ which extends through a stuffing-box $b^2$, arranged in one end of the cylinder. The piston has valve openings $b^3$ through it, one or more being employed, and valves $b^4$ are provided for said openings which may be of any suitable construction and adapted to operate as check valves, opening when the piston is moved in one direction and closing when the piston is moved in the opposite direction. The piston and cylinder are respectively adapted to be connected with the body and running gear of a vehicle, and referring to Fig. 1, a bail $c$ is connected to the piston-rod which embraces the cylinder and is loosely connected to the body at $c'$ and the cylinder is supported by a bracket $c^2$, which is loosely connected with the running gear at $c^3$ in any suitable manner.

Referring to Fig. 2, the position of the cylinder is reversed, and in such case the bail $c$ is omitted, the piston-rod $b'$ being loosely connected directly with the body, and the bracket is also omitted, the cylinder being loosely connected directly with the running gear. However, so far as my invention is concerned, any suitable means may be employed for loosely connecting said piston and cylinder in any suitable manner with the body and running gear.

The cylinder is formed or provided with a main by-pass $d$, which extends longitudinally with respect thereto for nearly the entire length thereof, and is in open communication with the interior thereof at its opposite ends, as at $d'$, $d^2$. As it is made quite long its points of communication with the interior of the cylinder are widely separated. It is provided with a regulating valve $d^3$ for reducing its area, said valve being herein shown as arranged to close more or less the communicating passage $d'$. The cylinder is also provided with a supplemental by-pass $e$ near its upper end, which is arranged opposite the upper end portion of the main by-pass. Said supplemental by-pass is in open communication with the interior of the cylinder at two or more closely disposed points, three communicating passages being herein shown as $e'$, $e^2$, $e^3$. It has a regulating valve $e^4$ for reducing its area which is herein arranged opposite the communicating passage $e^2$, and it also has a shut-off valve $e^5$ herein arranged opposite the communicating passage $e^3$. When said shut-off valve $e^5$ is open the three communicating passages are in open communication with the interior of the cylinder, and when closed only two of said communicating passages are in open communication therewith. In lieu of a supplemental by-pass of this construction, the supplemental by-pass shown in Fig. 3 may be employed, which, as will be seen, is made as a groove in the wall of the cylinder. The form shown in Fig. 1 is preferred on account of its adaptability for adjustment.

Normally the piston occupies a position near the upper end of the cylinder, as shown in the drawings, said parts being supported so as to enable this position to be normally maintained. Upon the occurrence of a feeble shock the piston moves downward a short distance and returns, and during its downward movement the valves $b^4$ open and the areas of the valve-openings plus the areas of the main and supplemental by-passes are such that no resistance whatsoever is offered during such time, but during the return or upward movement of the piston the valves $b^4$ close, and the areas of the main and supplemental by-passes are such that a feeble resistance is offered to the movement of the piston during such time. As the feeble shocks act to move downward the piston but a short distance, the supplemental by-pass will be made quite short. The resistance offered to the movement of the piston may be varied by regulating the valves $e^4$ and $d^3$.

Upon the occurrence of a violent shock the piston moves downward a long distance, passing beyond the lower end of the supplemental by-pass, and upon its downward movement the valves $b^4$ open so that during the first part of its downward movement no resistance whatsoever is offered, but after it has passed beyond the lower end of the supplemental by-pass, a slight resistance is offered notwithstanding the valves $b^4$ are open. During the upward movement of the piston the valves $b^4$ close and a great resistance is offered to the piston until it arrives at the lower end of the supplemental by-pass, and then such great resistance is reduced and a slight resistance offered until the piston resumes its normal position. Whether the shocks are feeble or violent the upward movement of the piston is limited by a yielding cushion which is provided at the upper end of the cylinder, by the formation thereat of a chamber above the upper ends of both the main and supplemental by-passes, both of said by-passes terminating a short distance below the upper end of the cylinder to enable said chamber to be formed. Therefore, it will be seen that upward movement of the piston is slightly restrained upon the occurrence of feeble shocks, and is substantially restrained upon the occurrence of violent shocks, and is limited by a yielding cushion at the upper end of its stroke.

Having thus described my invention, what I claim as new and desire to secure by Letters Patent is:—

1. In a shock absorber, the combination of a piston having a valve opening through it, a valve for said opening, a liquid-containing cylinder in which said piston works having a longitudinal main by-pass communicating with its interior at two widely separated points and having a longitudinal supplemental by-pass communicating with its interior at two closely disposed points which are arranged opposite the upper end portion of the main by-pass, whereby movement of the piston in one direction is slightly restrained during a short stroke and is severely restrained during a long stroke and means for connecting said cylinder and piston, respectively, with the body and running gear of a vehicle and for normally holding said parts with the piston opposite the supplemental by-pass, substantially as described.

2. In a shock absorber, the combination of a piston having a valve opening through it, a valve for said opening, a liquid-containing cylinder in which said piston works having a longitudinal main by-pass communicating with its interior at two widely separated points and having a longitudinal supplemental by-pass communicating with its interior at a plurality of closely disposed points, whereby movement of the piston in one direction is slightly restrained during a part of its stroke and is substantially restrained during another part of its stroke, a valve in said supplemental by-pass for shutting off a portion of it whereby its operative length may be varied, and means for connecting said cylinder and piston respectively with the body and running gear of a vehicle and for normally holding said parts with the piston opposite the supplemental by-pass, substantially as described.

3. In a shock absorber, the combination of a piston having a valve opening through it, a valve for said opening, a liquid-containing cylinder in which said piston works having a longitudinal main by-pass communicating with its interior at two widely separated points and having a longitudinal supplemental by-pass communicating with its interior at two closely disposed points which are arranged opposite the upper end portion of the main by-pass, whereby movement of the piston in one direction is slightly restrained during a part of its stroke, and is substantially restrained during another part of its stroke, means for regulating said supplemental by-pass to vary the resistance and means for connecting said cylinder and piston respectively with the body and running gear of a vehicle and for normally holding said parts with the piston opposite the supplemental by-pass, substantially as described.

4. In a shock absorber, the combination of a piston having a valve opening through it, a valve for said opening, a liquid-containing cylinder in which said piston works having a long longitudinal main by-pass and a short longitudinal supplemental by-pass, the latter being arranged opposite the upper end portion of the former, whereby both by-passes operate to relieve movement of the piston during a part of its stroke and one only operates to relieve movement thereof during another part of its stroke, and means connecting said cylinder and piston, respectively, with the body and running gear of a vehicle and for normally holding said parts with the piston opposite the supplemental by-pass, substantially as described.

In testimony whereof, I have signed my name to this specification, in the presence of two subscribing witnesses.

WILLIAM BRUCE KNAPP.

Witnesses:
B. J. NAYER,
H. B. DAVIS.